United States Patent [19]

Asada et al.

[11] Patent Number: 5,120,139
[45] Date of Patent: Jun. 9, 1992

[54] DYNAMIC PRESSURE GAS BEARING

[75] Inventors: Takafumi Asada, Hirakata; Hiroyuki Funasyo, Neyagawa, both of Japan

[73] Assignee: Matsushita Electric Industrial Co., Ltd., Osaka, Japan

[21] Appl. No.: 687,405

[22] Filed: Apr. 18, 1991

[30] Foreign Application Priority Data

Apr. 18, 1990 [JP] Japan ................. 2-101963

[51] Int. Cl.$^5$ ................. F16C 32/06
[52] U.S. Cl. ................. 384/107; 384/113
[58] Field of Search ............. 384/107, 109, 113, 121, 384/100, 114, 115, 120

[56] References Cited

U.S. PATENT DOCUMENTS

| | | | |
|---|---|---|---|
| 3,115,372 | 12/1963 | Bard | 384/107 |
| 4,798,476 | 1/1989 | Sakatani et al. | 384/113 X |
| 4,883,367 | 11/1989 | Maruyama | 384/107 X |
| 4,925,321 | 5/1990 | Maruyama et al. | 384/114 |
| 5,018,880 | 5/1991 | Nakasugi et al. | 384/107 X |

FOREIGN PATENT DOCUMENTS 113314 6/1984 Japan ................. 384/100

Primary Examiner—Thomas R. Hannon
Attorney, Agent, or Firm—Wenderoth, Lind & Ponack

[57] ABSTRACT

A dynamic pressure gas bearing includes a stationary shaft defined by an upper portion, a diameter reduced middle portion having a circumferential grooves running therearound, and a lower portion. A plurality of slanted grooves are formed on the circumferential surface of the upper and lower portions so as to form a herringbone pattern. A rotating unit is mounded on the stationary shaft. When operation, the rotating unit is driven, the air in the gap between the stationary shaft and the rotating unit moves and collects at the circumferential groove. The collected air is guided through a tunnel extending from the side of the circumferential groove to the top end of the shaft 2. The pressurized air blows out toward the end surface of the rotating unit to perform a contactless rotation of the rotating unit.

13 Claims, 4 Drawing Sheets

DYNAMIC PRESSURE GAS BEARING

BACKGROUND OF THE INVENTION

1. Field of the Invention

The present invention relates to a dynamic pressure gas bearing and, more particularly, to a dynamic pressure gas bearing for use in main spindles, for example, of a polygon mirror scanner.

2. Description of the Prior Art

Referring to FIG. 6, a prior art dynamic pressure gas bearing for use in a polygon mirror scanner is shown. Reference numeral 12 is a base in which the center portion thereof is provided with a shaft 13. Around the shaft 13, a cylindrical sleeve 14 having a flanged portion 14a is rotatably mounted with a suitable clearance between the shaft 13 and the cylindrical sleeve 14. The side wall surface of the shaft 13 is divided into three portions by two concentric circles. Each of divided portions is provided with a plurality of grooves in which grooves 13a are in a herringbone pattern, grooves 13c in a helical pattern and grooves 13b in a herringbone pattern, for generating a dynamic air pressure. The base 12 is further provided with a stator 15 thereon. The sleeve 14 is provided with a rotor 16 there around. The stator 15 and the rotor 16 construct a motor 17. The sleeve 14 is further provided with a round lid 18 inserted in one end positioned far from the base 13. The round lid 18 has a nozzle hole 18a passing through in alignment with the axis. A polygon mirror 19 having a center hole is provided around the sleeve 14 so as to sit on the flange part 14b. On the polygon mirror 19, a fixing plate having a center hole is provided around the sleeve 13. The sleeve 14, the polygon mirror 19, and the fixing plate 20 are integrally connected by bolts. The base 12 is provided with a cylindrical cover 21 to construct a housing for accommodating the above described matters therein and for keeping dust trespassing in. In the side wall of the cylindrical cover 21, a opening covered with a shield glass 21a is provided.

In operation, when the power is supplied to the dynamic pressure gas bearing described in the above, the motor 17 drives the sleeve 14. As the sleeve 14 rotates, the dynamic pressure generating grooves 13a and 13b generate a pumping effect by which the sleeve 14 will be rotated in no contact with the shaft 13. The round lid 18 is in contact with the shaft 13 when the sleeve 14 does not rotate. During the rotation, the air pumped by the helically patterned grooves 13c will generate a thrust force to lift us the round lid in a vertical direction shown by an arrow "A", when the pumped air blows out through the nozzle hole 8a. Thus, the round lid 18 lifts up, loses a contact with the shaft 13 and hovers in the air. The laser beam D enters into the housing through the shield glass 21a and reaches the polygon mirror 19 by which the laser beam is reflected.

However, a conventional dynamic pressure gas bearing as described above, shown in FIG. 6, may has such a problem as a seizure of the bearing shaft 2 caused by the dust entered between the shaft 13 and the sleeve 14. This dust is coming from, for example, the insulative coat of coils for the stator 15 and is fine enough to be measured in some micro meters order.

SUMMARY OF THE INVENTION

The present invention has been developed with a view to substantially solve the above described disadvantages and has for its essential object to provide an improved dynamic pressure gas bearing.

In order to achieve the aforementioned objective, the dynamic pressure gas bearing comprises a stationary shaft having an upper portion formed with a plurality of first slanted grooves therearound, and a lower portion formed with a plurality of second slanted grooves therearound and slanted in the direction opposite to that of the first slanted grooves and a diameter reduced portion between the upper and lower portions. The stationary shaft has a tunnel means extending from the diameter reduced portion to an end face of the upper portion. The dynamic pressure gas bearing further comprises a rotating unit formed with a one-end closed cylindrical opening for receiving the stationary shaft therein with a predetermined gap between an inner surface of the rotating unit and an outer surface of the stationary shaft, and a driving means for driving the rotating means to rotate about the stationary shaft, whereby an air pressure generated in said gap is guided through the tunnel means to lift the rotating unit during the rotation thereof.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
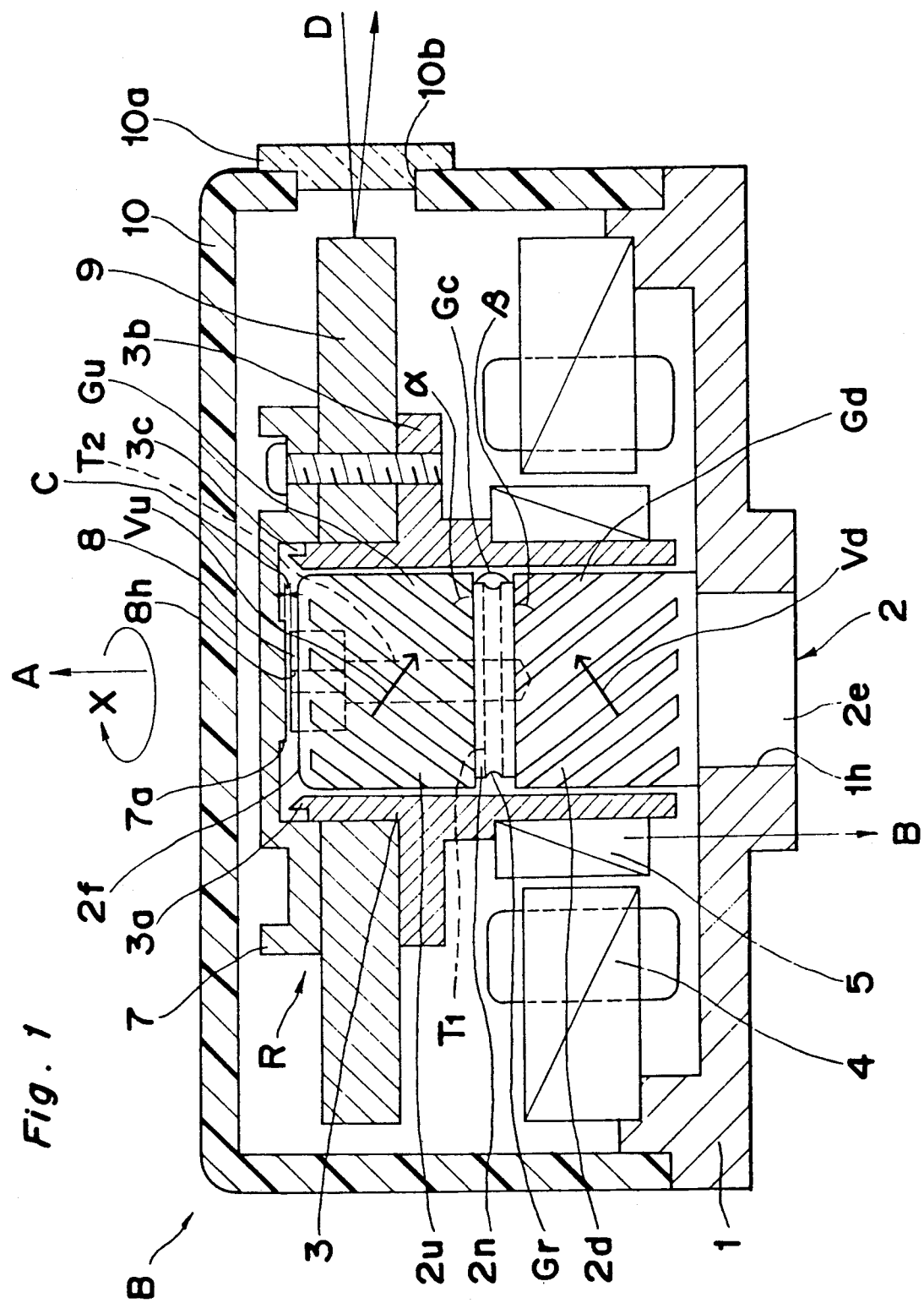
FIG. 1 is a cross sectional view of a dynamic pressure gas bearing of an embodiment according to the present invention.

Referring to FIG. 1, a dynamic pressure gas bearing for use in a polygon scanner according to the present invention is shown. A pressure gas bearing B comprises a round base 1 having a stepped side wall around the outer circumference thereof and a through-hole 1h formed at its center, and a stationary shaft 2 whose one end 2e is tightly inserted in the through-hole 1h and another end 2f is free. A stator 4 is mounted on the base 1, and a cylindrical dust cover 10 having an opening at one side is mounted on the base 1 so as to construct a housing for the dynamic pressure gas bearing B in an air tight manner. The cylindrical dust cover 10 is formed with a window 10b on the side wall thereof which is covered by a transparent shield glass 10a.

The main body portion of the shaft 2 is generally formed by a cylindrical solid bar having an outer diameter of approximately 5 mm to 20 mm and a diameter reduced portion 2n at about a center thereof. The length of the main body portion is approximately 30 mm to 80 mm. A portion below the diameter reduced portion 2n is referred to as a lower portion 2d and a portion above the diameter reduced portion 2n is referred to as an upper portion 2u.

By the walls of the diameter reduced portion 2n, a U-shaped cross-sectional circumferential groove Gc around the cylindrical bar is formed. Furthermore, at the bottom wall of the diameter reduced portion 2n, an arcuate circumferential groove Gr is formed.

The upper portion 2u is provided with a plurality of slanted grooves Gu on the circumferential surface. Slanted grooves Gu extend parallelly to each other, and each groove Gu is closed at its one end close to the free end 2f, and is opened at its other end at the diameter reduced portion 2n. The grooves Gu are slanted at an angle $\alpha$ with respect to a the circumferential groove Gc.

The lower portion 2d is provided with a plurality of slanted grooves Gd on the circumferential surface, which are slanted in opposite direction to those grooves Gu provided in the upper portion 2u. Each groove Gd is opened at its one end at the diameter reduced portion 2n, and is closed at its other end close to the fixed end 2e. The grooves Gd are slanted at angle $\beta$.

According to one example, each of the grooves Gu and Gd is preferably formed in a shape having a depth of approximately 8 $\mu$m, a width of approximately 0.5 mm to 1.0 mm, and a repeating pitch of approximately 0.5 mm to 1.5 mm between neighboring grooves.

The angles $\alpha$ and $\beta$ are set at the same angle, for example, of 25° in this embodiment. Thus, the two groups of grooves Gu and Gd make a herringbone pattern which is symmetric pattern with respect to the diameter reduced portion 2n.

Figure 5A:
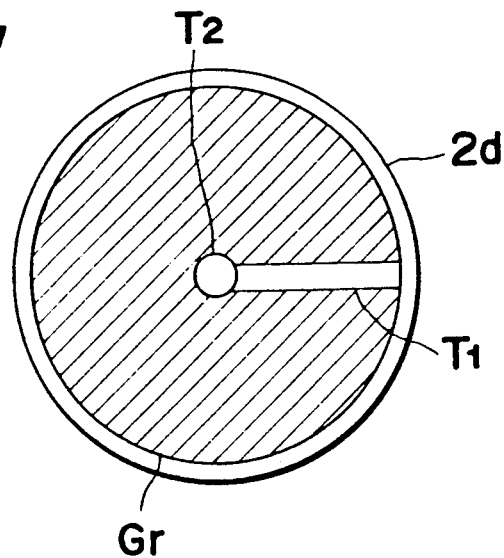
FIGS. 5a to 5b, a cross sectional view showing the air tunnels of the dynamic pressure gas bearing according to the present invention.
Figure 5B:
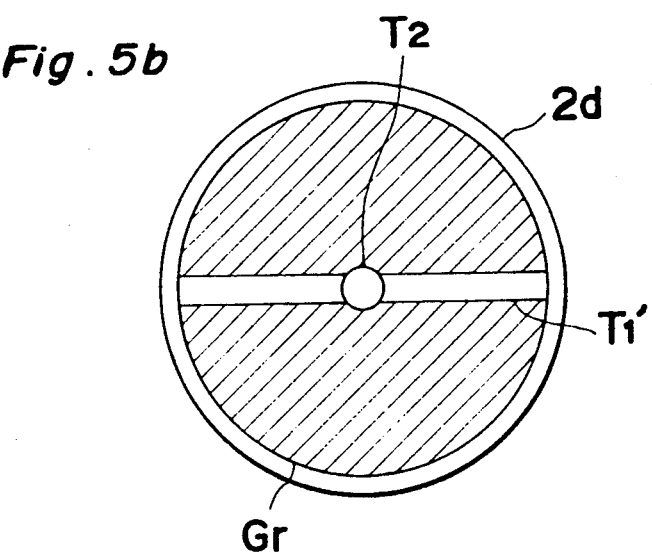
Figure 5C:
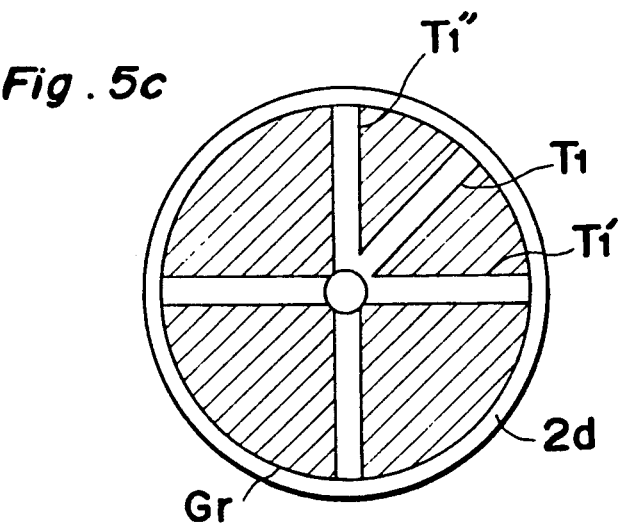

At the diameter reduced portion 2n, a radially extending tunnel T1 is formed. One end of which is being opened at the arcuate circumferential groove Gr and the other end terminating at the center of the diameter reduced portion 2n, as best shown in FIG. 5a. The diameter of tunnel T1 is, for example, 1.5 mm. The number of the radially extending tunnels T1 may be one as shown in FIG. 5a, or in any desired plurality, as shown in FIGS. 5b and 5c, provided that all the radially extending tunnels meet at the center of the portion 2n.

Furthermore, a tunnel T2 is formed along the axis of the shaft 2 having one end opened at the free end 2f and the other end meeting the radially extending tunnels T1 at the center of diameter reduced portion 2n. Thus, a through passage is formed by tunnels T1 and T2 from the arcuate circumferential groove Gr to the free end 2f. The diameter of the axial direction tunnel T2 is about 3 mm. According to a preferred embodiment, an upper end portion of the tunnel T2 is narrowed, for example, by embedding a nozzle block 8 formed with a nozzle hole 8h. The diameter and length of the nozzle hole 8h may be, for example, 0.5 mm and 2 mm, respectively. Preferably, the nozzle block 8 is extruding from the free end 2f of the shaft 2 by a predetermined amount, as shown in FIG. 1.

A cylindrical shaped sleeve 3 is rotatably provided around the main body portion of the shaft 2. The sleeve 3 has a flange 3b around an upper portion of the circumference thereof for mounting a polygon mirror 9 thereon and a projection wall 3a at the top of the sleeve 3 to define a dust collecting groove 3c together with a cap member 7. The projection wall 3a is tapered outwardly from the inner wall of the sleeve 3.

The cap member 7 is provided on the flange 3b to enclose the sleeve 3, and a number of bolts are used to firmly hold the cover 3, polygon mirror 9 and flange 3b together to construct an rotating unit R. The center portion 7a of the cap member 7 is thickened so that the bottom surface of the center portion 7a is located closely adjacent the top surface of the nozzle block 8. The diameter of the center portion 7a is smaller than the diameter of the shaft 2.

In operation, when the stator 4 is excited, the rotor 5 is driven to rotate the rotating unit R including sleeve 3, polygon mirror 9 and cap member 7 in a direction X at a high speed, for example, of 30,000 rpm. The laser beam D entering through the window 10b via the shield glass 10a reaches the polygon mirror 9 at which the laser beam D is reflected.

The air in a gap between the sleeve 3 and the shaft 2 is moved by the inner surface of the sleeve 3 rotating at such a high speed and pressurized by the grooves Gu and Gd to generate air pressure generally shown by vector arrows Vu and Vd due to the pumping effect generated thereby.

The air pressurized by the grooves Gu and Gd in a herringbone pattern is collected in the circumferential groove Gc and further in the arcuate circumferential groove Gr. Thus, the pressurized and collected air is guided in the tunnels T1 and T2 and is blown out from the nozzle hole 8h toward the bottom surface of the center portion 7a of the cap member 7. Thus, during the rotation, the rotating unit R is raised by a lifting power generated by the blowing air. The lifting power may be approximately 0.5 Kgf/cm$^2$ to 2.0 Kgf/cm$^2$. At a stable operation, the lifting power is counterbalanced with the gravity of the rotating unit R and the magnetic tractional force between the rotor 5 and the stator 4. When the rotating unit R is lifted up vertically by an amount C which is approximately equal to 5 $\mu$m to 20 $\mu$m. Thus, at the stable operation, the rotating unit R rotates in a contactless manner.

When any dust or abrasive is generated from the cap member 7 and/or the nozzle block 8 which are held in contact with each other during the non-operating period and at the initial and ending stages of the rotation of the rotating unit R, the dust or abrasive floating in the pressurized air is blown away in a radial direction by centrifugal force and will be collected by the dust groove 3b provided between the cover 7 and the sleeve 3, resulting in elimination of the seizure of the sleeve 3 to the shaft 2 caused by the burning of the dust or abrasive therebetween.

The dust cover 10 and the shield glass 10a are also provided to keep the dust and moisture off from the compartment of the dynamic pressure gas bearing B, thus preventing any dewing inside the bearing B, especially at polygon mirror 9.

Since the center portion 7a and the nozzle block 8 which are held in contact with each other during non-operating period, are formed with a relatively small area, the parallelism therebetween is obtained with very little deviation. Thus, it is ensured that the rotating unit R hovers stably in the air without any contact with the fixed parts, and is lifted up by a sufficient height.

As is clear from the above, since the air circulates in a closed-circuit through the tunnels T1 and T2 and through the gap between the shaft 2 and the sleeve 3, hardly any air enters from the gap at the bottom of the sleeve 3. Thus, no dust or abrasive generated from the stator 4 enters in the gap between the sleeve 3 and the shaft 2.

Figure 2:
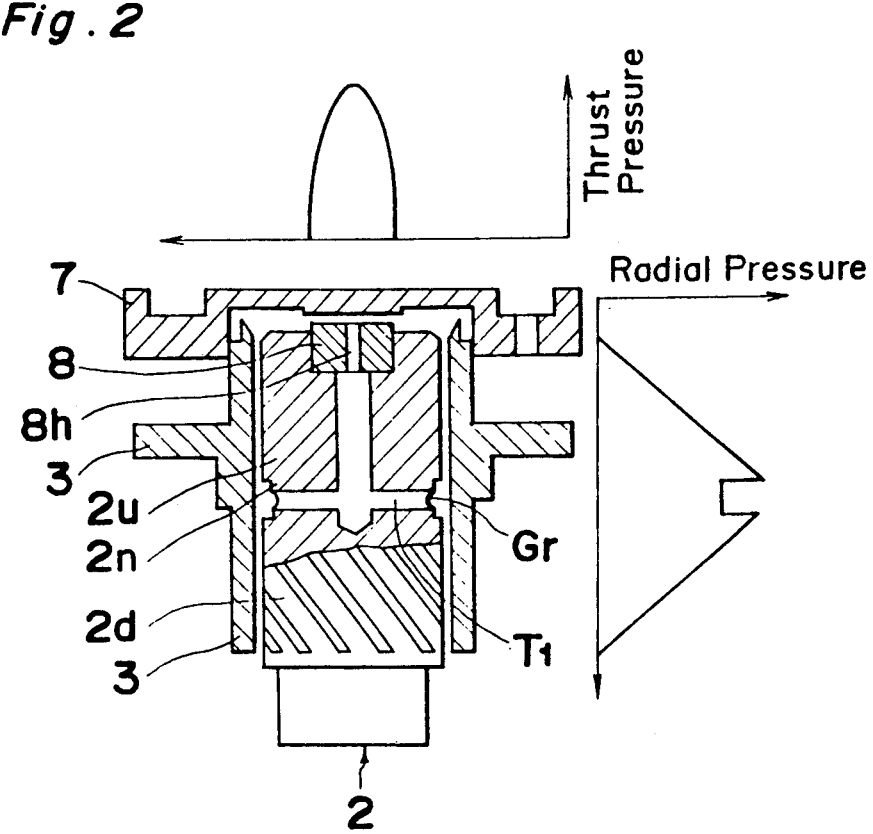
FIG. 2 is a diagrammatic view showing the pressure distributions around the shaft of the dynamic pressure gas bearing shown in FIG. 1.

Referring to FIG. 2, the air pressure distributions in the gap along the shaft surface are shown. The distribution of the lifting or thrust pressure exerted by the blowing air is shown at the top of the illustration, and the distribution of the radial pressure exerted by the grooves Gu and Gd is shown at the side of the illustration. The thrust pressure is distributed only within the surface area of the center portion 7a and shows its peak at the center where the nozzle hoe 8h confronts the thrust pressure. The radial pressure distribution has two peaks which are at the edges of the diameter reduced portion 2n.

Figure 3:
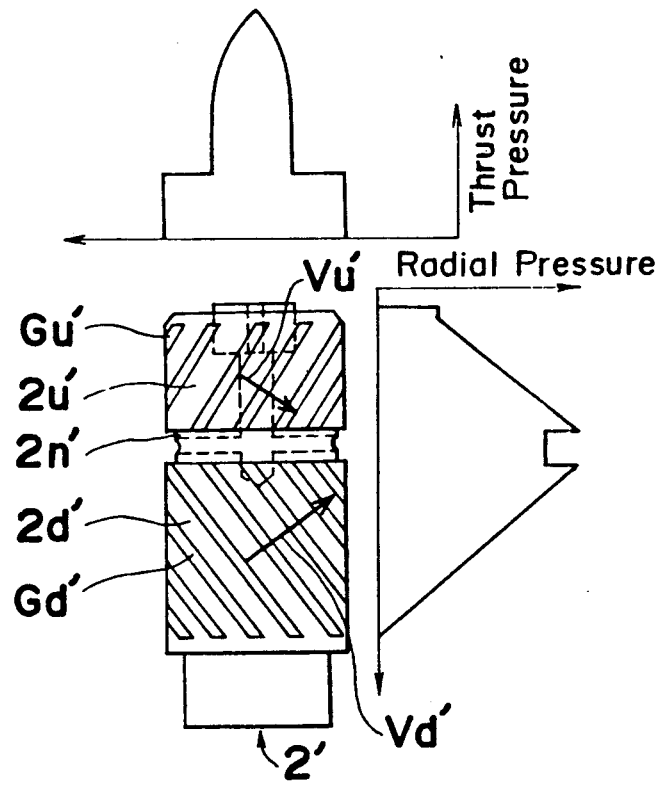
FIG. 3 is a diagrammatic view showing the pressure distributions the shaft of a modification of the dynamic pressure gas bearing according to the present invention.
Figure 4:
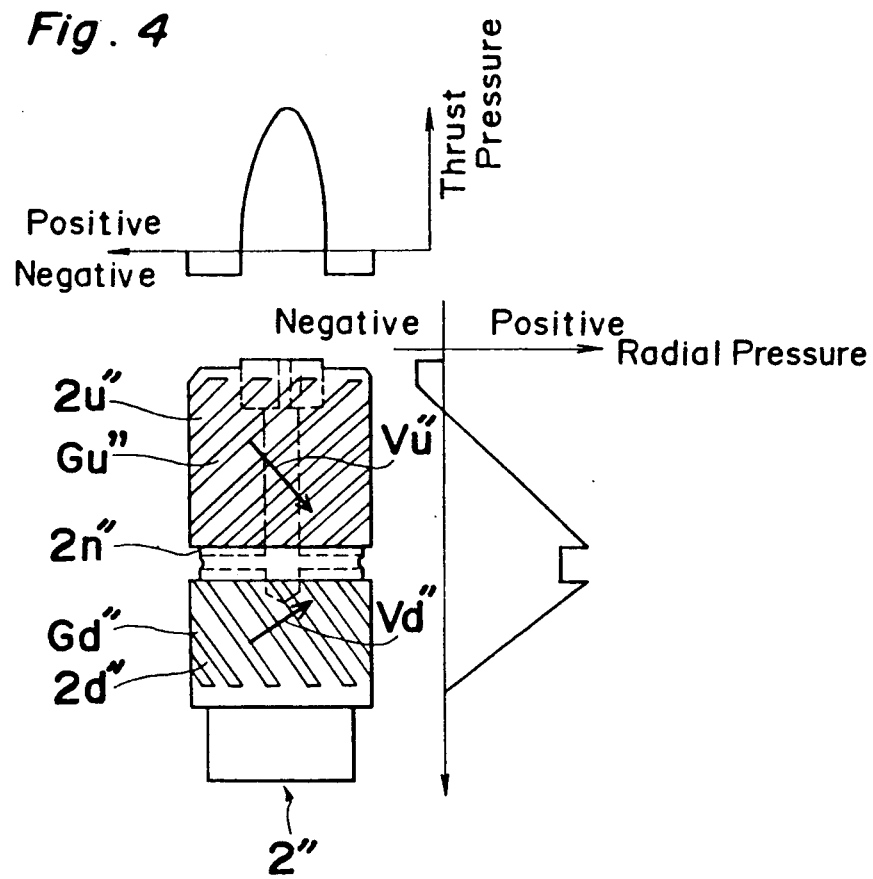
FIG. 4 is a diagrammatic view showing a the pressure distributions around the shaft of another modification of the dynamic pressure gas bearing according to the present invention.
Figure 6:
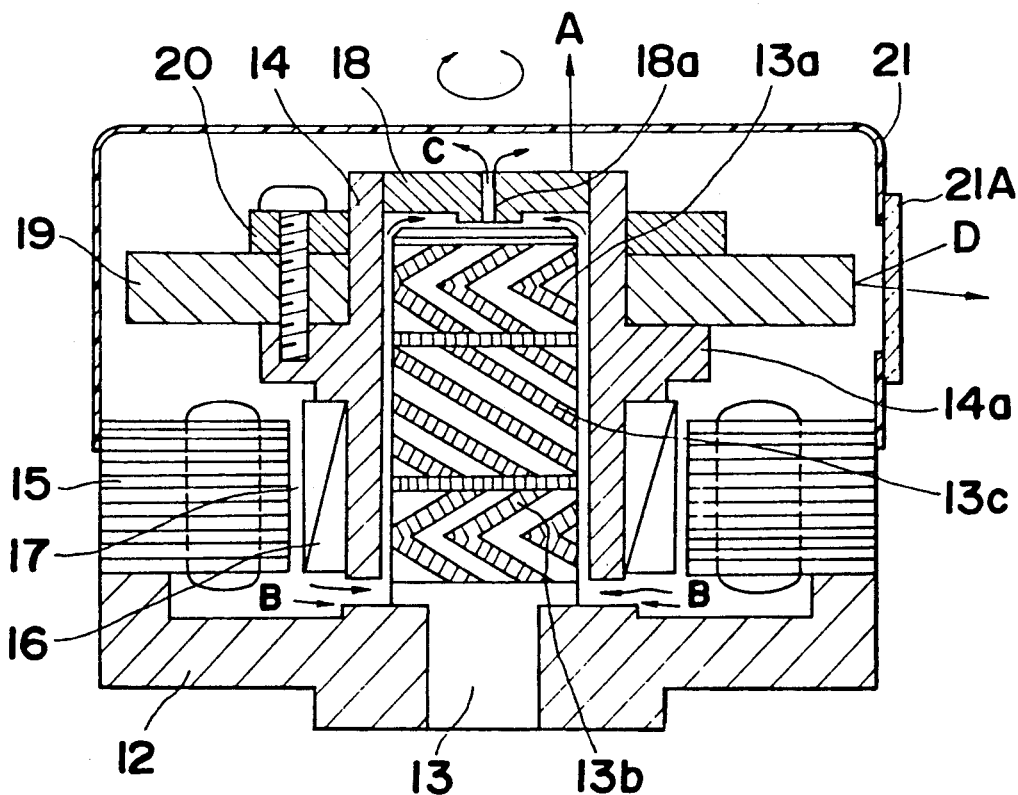
FIG. 6 is a cross sectional view of a sample of dynamic pressure gas bearing of the prior art.

Referring to FIGS. 3 and 4, modifications are shown. According to the above embodiment shown in FIG. 1, it has been described that the grooves Gu in the upper portion 2u and the grooves Gd in the lower portion 2d have the same length, but the length of such grooves Gu and Gd can be prepared with different length.

For example, as shown in FIG. 3, the grooves Gu' in the upper portion 2u, may be shorter than the grooves Gd' in the lower portion 2d'. The ratio between the grooves Gu, and Gd, may be 0.7:1. In this case, since the air pressures generated by grooves Gu' and Gd', which are generally indicated by vectors Vu' and Vd', respectively, is such that Vu'<Vd', an additional positive thrust pressure is obtained by the air blowing up from the upper edge gap between the sleeve 3 and the shaft 2.

On the other hand, as shown in FIG. 4, the grooves Gu'' in the upper portion 2u'' may be longer than the grooves Gd'' in the lower portion 2d''. The ratio between the grooves Gu, and Gd, may be 1:0.7. In this case, since the air pressures generated by grooves Gu'' and Gd'', which are generally indicated by vectors Vu'' and Vd'', respectively, is such that Vu''>Vd'', an additional negative thrust pressure is obtained by the suction air in to the upper edge gap between the sleeve 3 and the shaft 2.

According to a further modification of the present invention, it is possible to provide the grooves Gu and Gd on the inner surface of the sleeve 3 instead of on the outer surface of the shaft 2.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A dynamic pressure gas bearing comprising:
   a stationary shaft having an upper portion with a plurality of first slanted grooves therearound, a lower portion with a plurality of second slanted grooves therearound and slanted in a direction opposite to that of the first slanted grooves, and a reduced diameter portion between said upper and lower portions, said stationary shaft having a tunnel means including an axial tunnel portion extending from said reduced diameter portion to an end face of said upper portion, and a nozzle block embedded in said end face through which said axial tunnel portion extends;
   a rotating unit having a cylindrical opening closed at one end for receiving said stationary shaft therein with a predetermined gap between an inner surface of said rotating unit and an outer surface of said stationary shaft; and
   a driving means for driving said rotating means in rotation about said stationary shaft, whereby an air pressure generated in said gap is guided through said tunnel means to lift said rotating unit during the rotation thereof.

2. A dynamic pressure gas bearing as claimed in claim 1, wherein said rotating unit comprises a center portion confronting one end opening of said tunnel means.

3. A dynamic pressure gas bearing as claimed in claim 1, wherein said reduced diameter portion has an arcuate circumferential groove therearound.

4. A dynamic pressure gas bearing as claimed in claim 1, wherein said tunnel means further comprises:
   a radial tunnel portion radially extending from the center of said stationary shaft to the side wall of said diameter reduced portion; and
   a axial tunnel portion axially extending from the center of said stationary shaft to said end face, said axial tunnel portion meeting with said radial tunnel portion at said center of stationary shaft.

5. A dynamic pressure gas bearing as claimed in claim 4, wherein said radial tunnel portion is a tubular hole having a diameter of 1.5 mm.

6. A dynamic pressure gas bearing as claimed in claim 4, wherein said axial tunnel portion is a tubular hole having a diameter of 3 mm.

7. A dynamic pressure gas bearing as claimed in claim 1, wherein said axial tunnel portion formed in said nozzle block has a diameter smaller than that formed in said stationary shaft.

8. A dynamic pressure gas bearing as claimed in claim 1, wherein said first and second slanted grooves are slanted at an angle of 25°.

9. A dynamic pressure gas bearing as claimed in claim 1, wherein said first and second slanted grooves have lengths at ratio of 1:1.

10. A dynamic pressure gas bearing as claimed in claim 1, wherein said first and second slanted grooves have lengths at ratio of 1:0.7.

11. A dynamic pressure gas bearing as claimed in claim 1, wherein said first and second slanted grooves have lengths at ratio of 0.7:1.

12. A dynamic pressure gas bearing as claimed in claim 1, further comprising a dust groove formed in an inner surface of said rotating unit for collecting dusts.

13. A dynamic pressure gas bearing as claimed in claim 1, further comprising:
   a dust cover; and
   a base for receiving said stationary shaft.

* * * * *